United States Patent
Wang

(10) Patent No.: US 9,632,795 B2
(45) Date of Patent: Apr. 25, 2017

(54) ELECTRONIC DEVICE AND METHOD FOR MONITORING BATTERY MODULE OF THE SAME

(71) Applicant: GETAC TECHNOLOGY CORPORATION, Hsinchu County (TW)

(72) Inventor: Chun-Chi Wang, New Taipei (TW)

(73) Assignee: Getac Technology Corporation, Hsinchu County (TW)

( * ) Notice: Subject to any disclaimer, the term of this patent is extended or adjusted under 35 U.S.C. 154(b) by 273 days.

(21) Appl. No.: 14/556,048

(22) Filed: Nov. 28, 2014

(65) Prior Publication Data

US 2015/0268305 A1    Sep. 24, 2015

(30) Foreign Application Priority Data

Mar. 24, 2014 (CN) ............... 2014 1 0109785

(51) Int. Cl.
*G06F 1/26* (2006.01)
*G06F 9/44* (2006.01)
*G06F 1/32* (2006.01)

(52) U.S. Cl.
CPC ......... *G06F 9/4401* (2013.01); *G06F 1/3212* (2013.01); *G06F 9/4418* (2013.01); *Y02B 60/1292* (2013.01)

(58) Field of Classification Search
CPC .... G06F 1/3212; G06F 9/4401; G06F 9/4418; G06F 1/26; Y02B 60/1292
See application file for complete search history.

(56) References Cited

U.S. PATENT DOCUMENTS

| 5,872,453 A * | 2/1999 | Shimoyama | G01R 19/32 320/153 |
| 6,310,462 B1 * | 10/2001 | Arai | G01R 31/3624 320/132 |
| 2009/0234609 A1 * | 9/2009 | Teng | G01R 31/36 702/85 |
| 2011/0238250 A1 * | 9/2011 | Takao | B60L 1/16 701/22 |

FOREIGN PATENT DOCUMENTS

TW           201242360           10/2012

\* cited by examiner

*Primary Examiner* — Fahmida Rahman

(57) ABSTRACT

An electronic device including a control unit, an embedded controller and a battery module is provided. During a booting procedure of the electronic device, the embedded controller reads a reported battery capacity and a battery temperature of the battery module. The embedded controller determines whether the reported battery capacity is lower than a minimum capacity, and further determines whether the battery temperature is lower than a minimum temperature when the reported battery capacity is lower than the minimum capacity. When the reported capacity is lower than the minimum capacity and the battery temperature is also lower than the minimum temperature, the embedded controller generates a fake battery capacity, according to which an operating system of the electronic device performs various operations. In this application, the battery module of the electronic device remains working even when the electronic device is in a low-temperature and low-battery activation environment.

17 Claims, 3 Drawing Sheets

ELECTRONIC DEVICE AND METHOD FOR MONITORING BATTERY MODULE OF THE SAME

BACKGROUND OF THE INVENTION

Field of the Invention

The present invention relates to an electronic device, and more particularly, to an electronic device and a method for monitoring a battery module of the electronic device.

Description of the Prior Art

Various electronic devices need to be connected to external power sources or batteries in order to receive electric energy for sustaining operations. An electronic device that is portable instead of being fixed, e.g., a laptop computer or a tablet computer, usually relies on an allotted battery for providing electric energy required for operations.

To ensure stable operations, an electronic device usually monitors an electric capacity of a battery. In certain types of batteries having less satisfactory chemical properties and slower activation responses, in a low-temperature environment, the electric capacity may not be correctly measured or a zero electric capacity may be obtained from measurement even though the electric capacity of the battery is full. Under such circumstances, the electronic device may consider that a remaining electric capacity of the battery is insufficient for booting and may directly shut down the electronic device. Alternatively, when the electronic device is already operating on an operating system, the operating system may misjudge that the battery is depleted and turn off the electronic device or enter a sleep mode, such that a user can no longer utilize the operating system.

To solve the above issue, a common solution in the technical field is to search for a more robust battery having a preferred activation response and allot such battery to an electronic device that is utilized in a low-temperature environment. However, the root cause of the above issues remains unsolved by the above approach, and a throughput of the electronic device or the battery may not be enhanced.

Therefore, it is a research task of technical persons in the related field to design an electronic device that offers stable operations in a low-temperature environment and a method for monitoring a battery of the electronic device.

SUMMARY OF THE INVENTION

It is an object of the present invention to provide an electronic device and a method for monitoring a battery module of the electronic device, in a way that the electronic device powered by the battery module remains functional and operable even when the electronic device is in a low-temperature and low battery activation response environment.

To achieve the above object, an electronic device of the present invention at least includes a control unit, an embedded controller and a battery module. During a booting procedure of the electronic device, the embedded controller reads a reported battery capacity and a battery temperature of the battery module. The embedded controller determines whether the reported battery capacity is lower than a minimum capacity, and further determines whether the battery temperature is lower than a minimum temperature. When the reported capacity is lower than the minimum capacity and the battery temperature is also lower than the minimum temperature, the embedded controller generates a fake battery capacity, according to which an operating system of the electronic device performs various operations.

Compared to the prior art, the present invention achieves the technical effects below. When an electronic device is in a low-temperature environment in a way that an electric capacity of a battery cannot be correctly measured and the electronic device is accordingly inoperable, a fake battery capacity may be first generated such that the electronic device performs various operations according to the fake battery capacity. After the electronic device operates for a period of time and the battery activation response restores to a state in which the electric capacity can be correctly measured, an actual electric capacity of the battery is measured and reported to the electronic device. Thus, when the actual electric capacity of the battery cannot be correctly measured in a low-temperature environment, the issue that the electronic device is inoperable due to the battery in a low-environment temperature is prevented.

As described, with the electronic device and the method for monitoring the battery module of the electronic device of the present invention, in a manufacturing process of the electronic device, without involving batteries having preferred chemical responses and faster activation speeds and thus adaptive to utilization conditions in a low-temperature environment, performance and throughput of the electronic device and/or the battery can be effectively increased.

BRIEF DESCRIPTION OF THE DRAWINGS

The present invention will become more readily apparent to those ordinarily skilled in the art after reviewing the following detailed description and accompanying drawings, in which.

DETAILED DESCRIPTION OF THE EMBODIMENTS

A preferred embodiment of the present invention is described in detail below with reference to the accompanying drawings.

Figure 1:
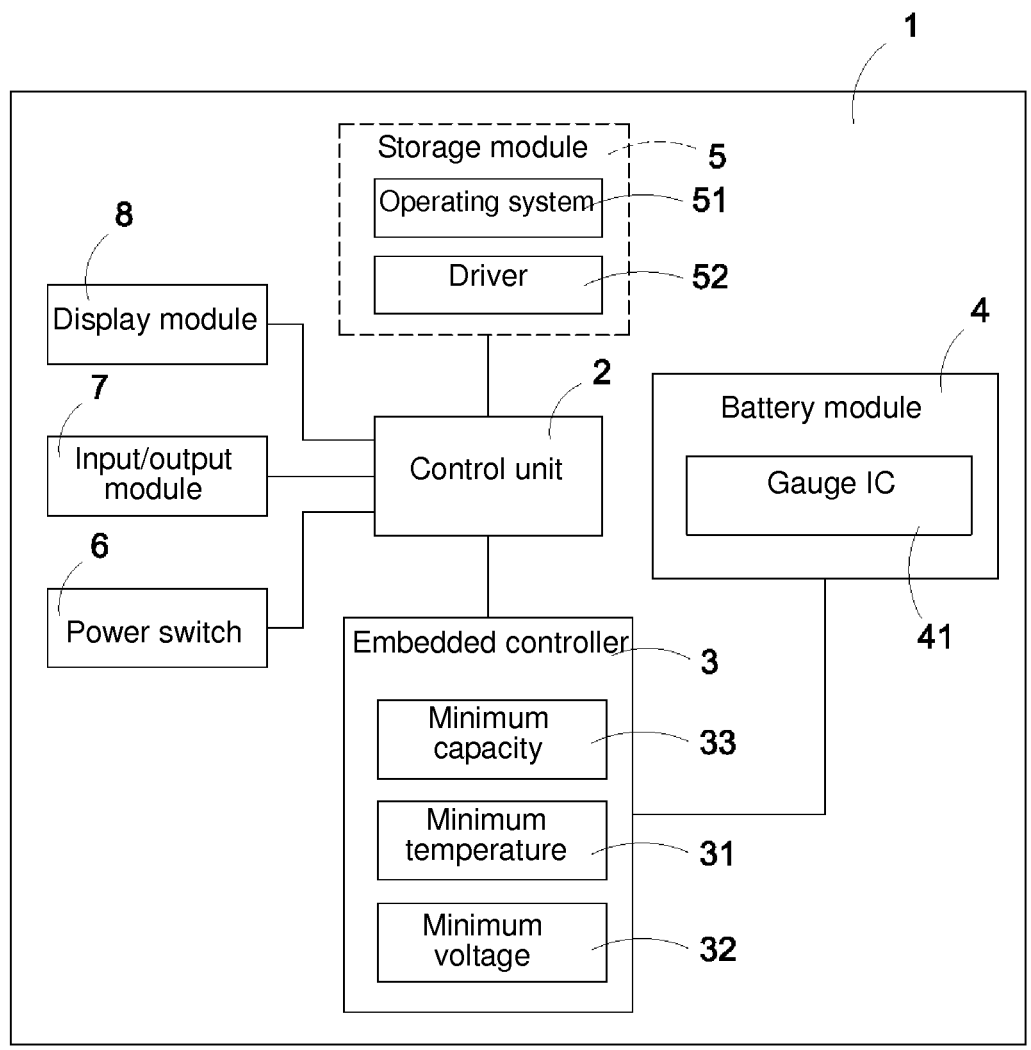
FIG. 1 is a block diagram according to a first embodiment of the present invention.

FIG. 1 shows a block diagram of a first embodiment of the present invention. The present invention discloses an electronic device 1. For example but not limited to, the electronic device 1 is a personal computer, a laptop computer, a tablet computer, a mobile phone, or a personal digital assistant (PDA).

As shown in FIG. 1, the electronic device 1 mainly includes a control unit 2, an embedded controller 3, a battery module 4, and a storage module 5. The control unit 2, electrically connected to the embedded controller 3 and the storage module 5, integrates the embedded controller 3 and the storage module 5, and processes instructions and signals transmitted between the two. In the embodiment, the control unit 2 mainly refers to but is not limited to a southbridge chip in the electronic device 1. The storage module 5 stores an operating system 51. The control unit 2 executes the operation system 51 after the electronic device 1 is powered on and activated, and an entire booting procedure is then performed by the operating system 51.

The battery module 4, electrically connected to the embedded controller 3, provides electric energy that the electronic device 1 requires for operations. Meanwhile, the embedded controller 3 is chiefly responsible for monitoring an electric capacity of the battery module 4. However, when an ambient temperature around the electronic device 1 is too low (e.g., lower than −10° C.), the activation response of the battery module 4 may be affected by the low temperature. As such, even if the actual remaining electric capacity of the battery module 4 is higher than a threshold required by the operations of the electronic device 1, the electronic device 1, while attempting to obtain the actual electric capacity of the battery module 4, may misjudge that the actual electric capacity of the battery module 4 is insufficient for the electronic device 1 to execute the booting procedure (i.e., insufficient for normal operations of the operating system 51). In other words, a main issue to be solved by the present invention is to enable the electronic device 1 to normally utilize the battery module 4 in a low-temperature environment.

Immediately after being externally triggered and activated, the electronic device 1 constantly reads a reported battery capacity and a battery temperature from the embedded controller 3. In the embodiment, the reported battery capacity is electricity amount data of the battery module 4 that is currently measured. However, due to effects of the temperature, the reported battery capacity may be correct data or incorrect data. For the battery module 4, the battery temperature is the ambient temperature around the battery module 4.

The embedded controller 3 records a minimum capacity 31 and a minimum temperature 32. The minimum capacity 31 corresponds to minimum electric energy that the electronic device 1 requires for operations, and the minimum temperature 32 corresponds to a minimum temperature of the battery module 4 that can be correctly measured. Upon obtaining the reported battery capacity and the battery temperature, the embedded controller 3 first determines whether the reported battery capacity is lower than the minimum capacity 31, and whether the battery temperature is lower than the minimum temperature 32.

When the embedded controller 3 determines that the reported battery capacity is lower than the minimum capacity 31, it means that the electric energy of the battery module 4 is insufficient for supporting the electronic device 1 to perform the booting procedure. Under such conditions, however, the embedded controller 3 is unsure of whether the reported battery capacity is the actual electric capacity of the battery module 4. Therefore, it is further determined whether the battery temperature is lower than the minimum temperature 32. When the reported battery capacity 32 is lower than the minimum capacity 31 and the battery temperature is also lower than the minimum temperature 32, the embedded controller 3 then determines that the electric energy of the battery module 4 cannot be correctly measured as the battery module 4 is currently affected by a low temperature. Thus, the embedded controller 3 generates a fake battery capacity, according to which the electronic device 1 temporarily operates (i.e., the fake battery capacity is regarded as the electric capacity of the battery module 4 obtained through monitoring). In the embodiment, the fake battery capacity is higher than the reported battery capacity, and higher than the minimum capacity 31.

In the above conditions, if the embedded controller 3 directly provides the reported battery capacity that is lower than the minimum capacity 31 to the control unit 2, the control unit 2 reckons that the electric energy of the battery module 4 is insufficient for the booting procedure, and directly controls the electronic device 1 to shut down or enter a sleep mode. More specifically, after the electronic device 1 is powered on and activated, the control unit 2 executes the operating system 51, which inquires the embedded controller 3 for the battery capacity of the battery module 4. If the embedded controller 3 directly provides the reported battery capacity that is lower than the minimum capacity 31 to the operating system 51, the operating system 51 reckons that the electric energy of the battery module 4 is insufficient for sustaining operations, and controls the electronic device 1 to shut down or enter a sleep mode via a driver 52. The sleep mode here refers to, but is not limited to, the Suspend to disk (S4) mode in the Advanced Configuration Power Interface (ACPI) standard.

After generating the fake battery capacity, the embedded controller 3 replies to the operating system 51 of the fake battery capacity, which continues operating (e.g., the booting procedure or other operations subsequent to the booting procedure) according to the fake battery capacity. Under such conditions, the operating system 51 reckons that the fake battery capacity is the actual electric capacity of the battery module 4. As the fake battery capacity is higher than the minimum capacity 31, the operating system 51 determines that the electric energy of the battery module 4 is sufficient for sustaining operations. Thus, even when the actual electric energy of the battery module 4 cannot be correctly measured under the influence of the low temperature or be misjudged as being insufficient for the booting procedure, by using the electronic device 1 and the method for monitoring the battery module 4 of the electronic device 1 of the present invention, the electronic device 1 can still normally utilize the battery module 4.

For example but not limited to, the operating system 51 may be a Windows OS, OS X Mountain Lion, a Chrome OS, ubuntu, iOS, or Android. As previously stated, the control unit 2 mainly loads and executes the operating system 51 stored in the storage module 5, and the booting procedure is continued by the operating system 51. After completing the booting procedure, one may operate the loaded operating system 51 on the electronic device 1.

As previously stated, the embedded controller 3 constantly monitors and reads the battery capacity of the battery module 4 after the electronic device 1 is powered on and activated. After the electronic device 1 is powered on and activated, if the embedded controller 3 immediately receives a battery capacity inquiry, the embedded controller 3 replies to the above reported battery capacity or the fake battery capacity to the control unit 2. In contrast, when the operating system 51 is executed by the control unit 2 and the embedded controller 3 receives a battery capacity inquiry from the operating system 51, the embedded controller 3 replies the above reported battery capacity or the fake battery capacity to the operating system 51.

When the embedded controller 3 determines that the reported battery capacity is higher than the minimum capacity 31, it means that the battery module 4 can be correctly measured, and the actual electric energy of the battery module 4 is sufficient for operations. Thus, in response to the battery capacity inquiry from the operating system 51, the embedded controller 3 may directly reply to the operating system 51 of the reported battery capacity. Further, when the embedded controller 3 determines that the reported battery capacity is lower than the minimum capacity 31 whereas the battery temperature is higher than the minimum temperature 32, it means that the battery module 4 can be correctly measured, with however the actual electric capacity being insufficient for operations. Thus, in response to the battery capacity inquiry from the operating system 51, the embedded controller 3 still directly replies the reported battery capacity to the operating system 51, such that the operating system 51 controls the electronic device 1 to immediately shut down, or to enter a sleep mode via the driver 52.

It should be noted that, the embedded controller 3 may further record a minimum voltage 33, and may first monitor and read a supply voltage of the battery module 4 before reading the reported battery capacity and the battery temperature. When the supply voltage is lower than the minimum voltage 33, it means that the battery module 4 can no longer be normally utilized. As such, the embedded controller 3, instead of reading the reported battery capacity and the battery temperature, directly controls the electronic device 1 to shut down. Only when the supply voltage is higher than the minimum voltage, the embedded controller 3 further monitors and reads the reported battery capacity and the battery temperature, and performs the step of determining whether to generate the fake battery capacity at the time when receiving the battery capacity inquiry. However, the above description is an elaboration of a preferred embodiment for better understanding the present invention, not limiting the present invention. That is, the embedded controller 3 need not necessarily monitor, read and determine whether the supply voltage of the battery module 4 is sufficient, and may be designed according to actual requirements.

As shown in FIG. 1, the battery module 4 may further include a gauge integrated circuit (IC). In the embodiment, the gauge IC is mainly for constantly monitoring the supply voltage, the reported battery capacity and the battery temperature of the battery module 4, and storing detected data. When the embedded controller 3 is to monitor and read the supply voltage, the reported battery capacity and the battery temperature of the battery module 4, the embedded controller 3 chiefly communicates with the gauge IC, and reads the data stored in the gauge IC to accordingly obtain the supply voltage, the reported battery capacity and the battery temperature.

The electronic device 1 may further include a power switch 6, an input/output module 7, and a display module 8, which are all connected to the control unit 2. One may press the power switch 6 to trigger the electronic device 1 to activate, and to prompt the electronic device 1 to enter the determination step in the foregoing description. When the electronic device 1 is powered on and activated as well as having loaded the operating system 51, one may interact with the electronic device 1 via the input/output module 7 to operate the operating system 51 executed on the electronic device 1. Further, various types of information displayed by the operating system 51, for example but not limited to, the fake battery capacity, the reported battery capacity and the battery temperature, may be browsed via the display module 8.

Figure 2:
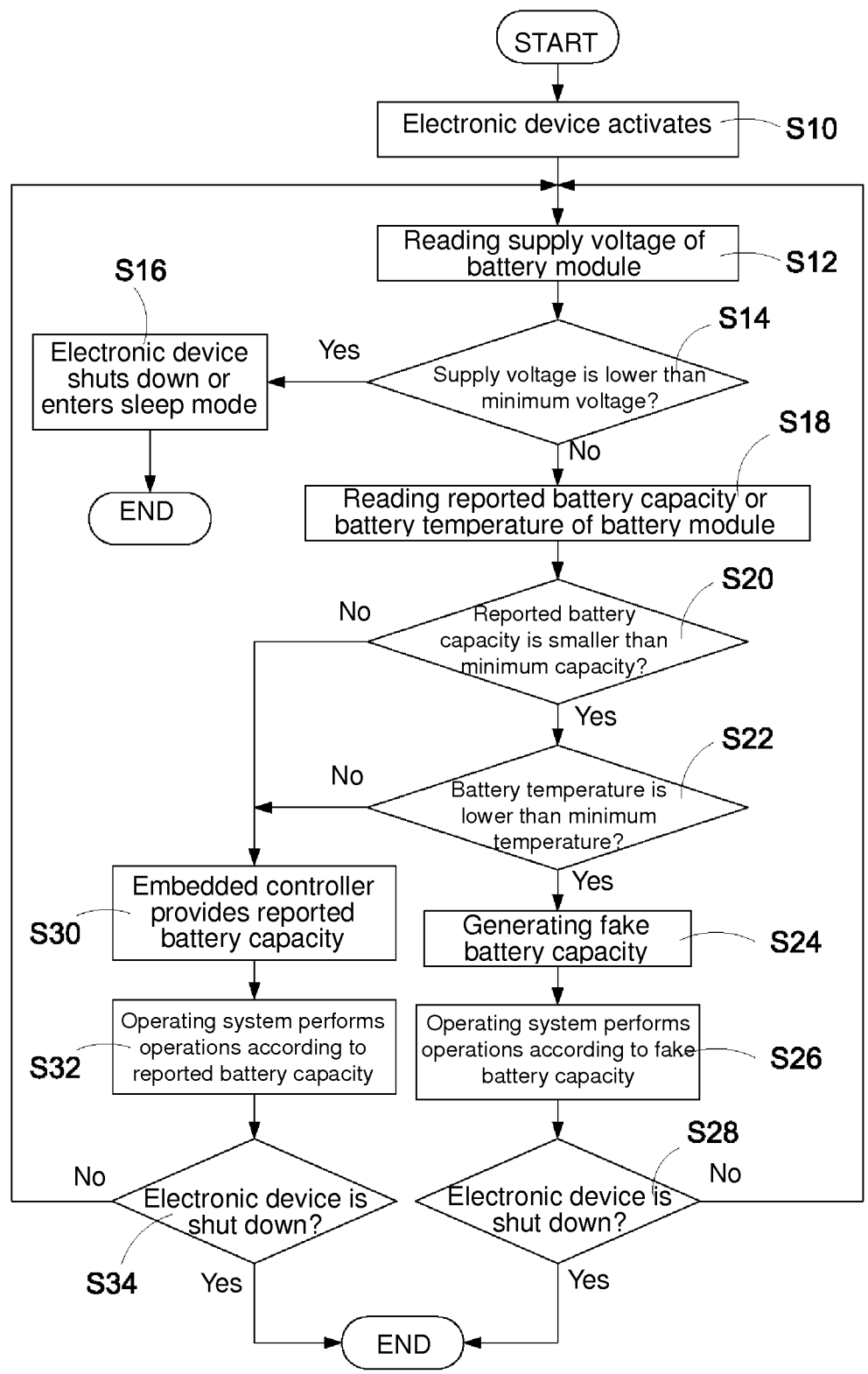
FIG. 2 is a first flowchart of a first booting procedure according to the first embodiment of the present invention.

FIG. 2 shows a first flowchart of a first booting procedure according to the first embodiment of the present invention. To perform the method for monitoring a battery module of the present invention, in step S10, the electronic device 1 is externally triggered and activated. In step S12, the electronic device 1 reads the supply voltage of the battery module 4. More specifically, in step S12, the embedded controller 3 monitors and reads the gauge IC 41 in the battery module 4 to obtain the supply voltage detected by the gauge IC 41.

In step S14, it is determined whether the supply voltage is lower than the minimum voltage 33. When the supply voltage is lower than the minimum voltage 33, the electronic device 1 directly shuts down, or enters a sleep mode via the driver 52, as in step S16. When the supply voltage is not lower than the minimum voltage 33, the reported battery capacity and the battery temperature of the battery module 4 are further read, as in step S18. More specifically, in step S18, the embedded controller 3 monitors and reads the gauge IC 41 in the battery module 4 to obtain the reported battery capacity and the battery temperature detected by the gauge IC 41. In step S20 following step S18, the embedded controller 3 determines whether the reported battery capacity is smaller than the minimum capacity 31. When the reported battery capacity is smaller than the minimum capacity 31 and the battery temperature is also lower than the minimum temperature 32 (step S22), the fake battery capacity is generated in step S24. In step S26 following step S24, the operating system 51 performs various operations according to the fake battery capacity. Meanwhile, in step S28, during the process of performing the various operations, the operating system 51 constantly determines whether the electronic device 1 is (to be) shut down. When the electronic device 1 is (to be) shut down, the process of the method of the present invention ends. Conversely, when the electronic device 1 is still in use, the process returns to step S12, in which the embedded controller 3 constantly monitors the supply voltage, the reported battery capacity and the battery temperature of the battery module 4, and the operating system 51 constantly inquires the embedded controller 3 for the battery capacity of the battery module 4.

In a preferred embodiment, for example, the fake battery capacity may be set to 50% of a total electric capacity of the battery module 4, the minimum capacity 31 may be 0% of the total electric capacity of the battery module 4 (i.e., given the remaining electric capacity is higher than 0%, the remaining electric capacity is reckoned as being sufficient for the booting procedure), and the minimum temperature may be set to −10° C. (i.e., the actual electric capacity of the battery module 4 cannot be correctly measured when the temperature is lower than −10° C.). It should be noted that, the description above are illustrations of preferred embodiments for better explaining the present invention, not limiting the present invention, and the exemplary data may be modified and configured according to user requirements.

When the embedded controller 3 determines that the reported battery capacity is not lower than the minimum capacity 31 in step S20, or when the embedded controller 3 determines that the battery temperature is higher than the minimum temperature 32 in step S22, the embedded controller 3 generates and directly provides the reported battery capacity in step S30. More specifically, the embedded controller 3 constantly monitors and reads the reported battery capacity and the battery temperature, and constantly provides the reported battery capacity or the fake battery capacity. Therefore, regardless of which unit raises the battery capacity inquiry to the embedded controller 3, the reported battery capacity or the fake battery capacity provided by the embedded controller 3 can be obtained at the corresponding time point.

In step S30, when the operating system 51 at this point raises the battery capacity inquiry to the embedded controller 3, the reported battery capacity provided by the embedded controller 3 can be obtained. Thus, in step S32, the operating system 51 performs various operations according to the reported battery capacity (i.e., the actual electric capacity of the battery module 4). In contrast, when the operating system 51 raises the battery capacity inquiry to the embedded system 3 at a time point in step S24, the fake battery capacity is obtained.

In step S34, the operating system 51 constantly determines whether the electronic device 1 is (to be) shut down. The method of the present invention ends when the electronic device 1 is (to be) shut down. Conversely, when the electronic device 1 is still in use, the process of the method returns to step S12, the embedded controller 3 constantly monitors to obtain the supply voltage, the reported battery capacity and the battery temperature of the battery module 4, and the operating system 51 constantly inquires the embedded controller 3 for the battery capacity of the battery module 4.

Figure 3:
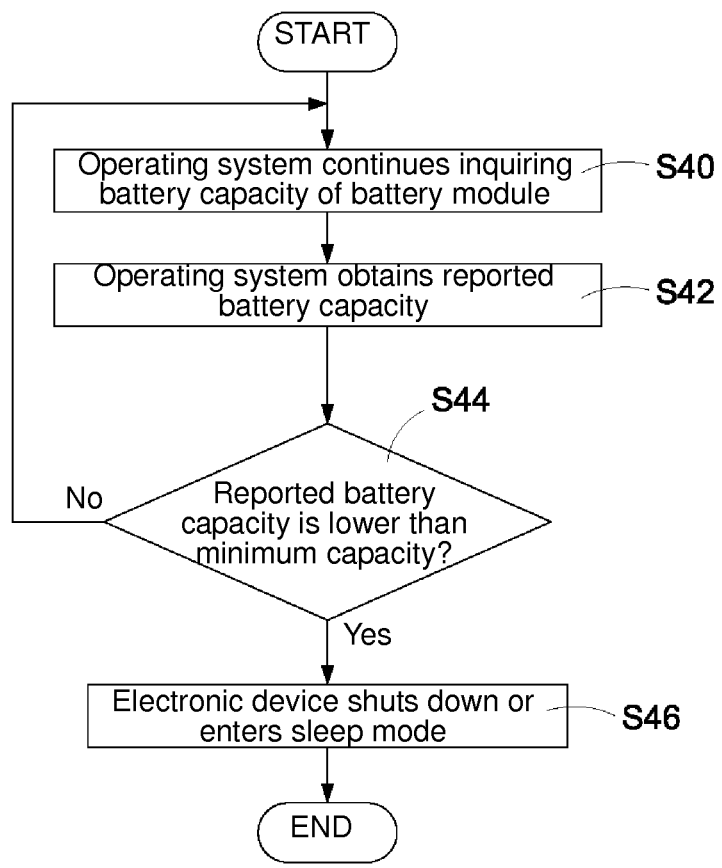
FIG. 3 is a second flowchart of a booting procedure according to the first embodiment of the present invention.

FIG. 3 shows a second flowchart of a booting procedure according to the first embodiment of the present invention. In step S40, during normal operations, the operating system 51 constantly inquires the embedded controller 3 for the battery capacity of the battery module 4. In step S42, the operating system 51 may also obtain the reported battery capacity from the embedded controller 3. It should be noted that, when the operating system 51 obtains the fake battery capacity from the embedded controller 3, an issue of determining whether to shut down or to enter the sleep mode is eliminated as the fake battery capacity is higher than the minimum capacity 31.

In step S44, the operating system 51 determines whether the reported battery capacity (i.e., the actual electric capacity of the battery module 4) is lower than the minimum capacity 31. When the reported battery capacity is higher than the minimum capacity 31, it means that the actual electric capacity of the battery module 4 is still sufficient for sustaining normal operations of the operating system 51, and the process of the method returns to step S40, in which the operating system 51 continues normal operations and constantly inquires the embedded controller 3 for the battery capacity. For example but not limited to, the inquiry of the operating system 51 may be sent out in a timed and periodical manner, or may be triggered by a specific event. When the reported battery capacity is lower than the minimum capacity 31, in step S46, the operating system 51 controls the electronic device 1 to shut down or to enter the sleep mode via the driver 52.

With the present invention, given the battery module 4 practically has a remaining electric capacity for further use, even when the battery module 4 cannot be correctly measured due to a low temperature, the booting procedure of the electronic device 1 can still be performed by using the electric energy provided by the battery module 4, thereby eliminating a measurement error that may cause the electronic device 1 to be inoperable.

While the invention has been described in terms of what is presently considered to be the most practical and preferred embodiments, it is to be understood that the invention is only illustrative and needs not to be limited to the above embodiments. It should be noted that, equivalent variations and replacements made to the embodiments are to be encompassed within the scope of the present invention. Therefore, the scope of the present invention is to be accorded with the appended claims.

What is claimed is:

1. A method for monitoring a battery module, the battery module applied to an electronic device, the method comprising:
   reading a reported battery capacity and a battery temperature of the battery module;
   determining whether the reported battery capacity is smaller than a minimum capacity required for device operations;
   when the reported battery capacity is lower than the minimum capacity, determining whether the battery temperature is lower than a minimum temperature;
   in response to determining that the battery temperature is lower than the minimum temperature and the reported battery capacity is lower than the minimum capacity, generating, by a controller, a fake battery capacity and operating the electronic device according to the fake battery capacity, wherein the fake battery capacity is higher than the minimum capacity; and
   when the reported battery capacity is higher than the minimum capacity or the battery temperature is higher than the minimum temperature, operating the electronic device according to the reported battery capacity.

2. The method according to claim 1, before the step of reading the reported battery capacity and the battery temperature of the electronic device, further comprises:
   the electronic device being powered on and activated.

3. The method according to claim 1, wherein when the electronic device is powered on, the following steps are performed:
   reading an initial reported battery capacity and an initial battery temperature of the battery module;
   determining whether the initial reported battery capacity is smaller than the minimum capacity;
   when the initial reported battery capacity is lower than the minimum capacity, determining whether the initial battery temperature is lower than the minimum temperature;
   when the battery temperature is lower than the minimum temperature, generating an initial fake battery capacity;
   performing, by the electronic device, a booting procedure according to the initial fake battery capacity.

4. The method according to claim 3, wherein the step of the electronic device performing the booting procedure is performed by an operating system of the electronic device, and the operating system operates according to the fake battery capacity.

5. The method according to claim 1, wherein the step of operating the electronic device according to the reported battery capacity comprises:
   receiving a battery capacity inquiry from an operating system of the electronic device, and
   when the reported battery capacity is higher than the minimum capacity or the battery temperature is higher than the minimum temperature, providing the reported battery capacity to the operating system, wherein the operating system operates according to the reported battery capacity.

6. The method according to claim 1, wherein the step of operating the electronic device according to the fake battery capacity comprises:
   receiving a battery capacity inquiry from an operating system of the electronic device, and
   when it is determined the reported battery capacity is lower than the minimum capacity and the battery temperature is lower than the minimum temperature, providing the fake battery capacity to the operating system, wherein the operating system operates according to the fake battery capacity.

7. The method according to claim 5, further comprising:
   when the temperature is higher that than the minimum temperature and the reported battery capacity is lower than the minimum capacity, controlling the electronic device to shut down or to enter a sleep mode.

8. The method according to claim 2, further comprising the following steps performed before the step of reading the reported battery and the battery temperature of the battery module:
   reading a supply voltage of the battery module;

determining whether the supply voltage is lower than a minimum voltage;

controlling the electronic device to shut down when the supply voltage is lower than the minimum voltage; and reading the reported battery capacity and the battery temperature of the battery module when the supply voltage is higher than the minimum voltage.

9. The method according to claim 8, wherein the battery module comprises a gauge integrated circuit (IC); the electronic device detects the supply voltage, the reported battery capacity and the battery temperature of the battery module via the gauge IC, and stores the supply voltage, the reported battery capacity and the battery temperature.

10. The method according to claim 9, wherein the electronic device comprises an embedded controller, and reads the supply voltage, the reported battery capacity and the battery temperature of the battery module by the embedded controller from the gauge IC.

11. An electronic device, comprising:
a battery module, configured to power the electronic device;
an embedded controller, electrically connected to the battery module, configured to read a reported battery capacity and a battery temperature of the battery module to determine whether the reported battery capacity is smaller than a minimum capacity required for device operations and the battery temperature is lower than a minimum temperature, and to generate a fake battery capacity in response to a determination that the battery capacity is lower than the minimum capacity and the battery temperature is lower than the minimum temperature;
a control unit, electrically connected to the embedded controller, configured to operate according to the fake battery capacity when the battery capacity is lower than the minimum capacity and the battery temperature is lower than the minimum temperature, and to operate according to the reported battery capacity when the reported battery capacity is higher than the minimum capacity or the battery temperature is higher than the minimum temperature.

12. The electronic device according to claim 11, wherein the battery module comprises a gauge IC, which is configured to detect and store a supply voltage, the reported battery capacity and the battery temperature of the battery module for the embedded controller to read from.

13. The electronic device according to claim 12, wherein the embedded controller controls the electronic device to shut down when determining that the supply voltage of the battery module is lower than a minimum voltage, and reads the reported battery capacity and the battery temperature when determining that supply voltage is higher than the minimum voltage.

14. The electronic device according to claim 11, further comprising:
a storage module, electrically connected to the control unit, configured to store an operating system;
wherein, the control unit executes the operating system, and the operating system operates according to the fake battery capacity when the battery capacity is lower than the minimum capacity and the battery temperature is lower than the minimum temperature.

15. The electronic device according to claim 14, wherein:
the embedded controller receives a battery capacity inquiry from the operating system; and
when determining that the reported battery capacity is higher than the minimum capacity, the embedded controller further replies the reported battery capacity to the operating system to make the operating system operate according to the reported battery capacity.

16. The electronic device according to claim 14, wherein:
the embedded controller receives a battery capacity inquiry from the operating system; and
when determining that the reported battery capacity of the battery module is lower than the minimum capacity and the battery temperature is higher than the minimum temperature, the embedded controller further replies to the operating system of the reported battery capacity to make the operating system operate according to the reported battery capacity.

17. The electronic device according to claim 16, wherein:
the storage module stores a driver; and
when determining that the reported battery capacity is lower than the minimum capacity, the operating system controls the electronic device to shut down or to enter a sleep mode via the driver.

* * * * *

UNITED STATES PATENT AND TRADEMARK OFFICE
CERTIFICATE OF CORRECTION

PATENT NO. : 9,632,795 B2  
APPLICATION NO. : 14/556048  
DATED : April 25, 2017  
INVENTOR(S) : Chun-Chi Wang Page 1 of 1

It is certified that error appears in the above-identified patent and that said Letters Patent is hereby corrected as shown below:

On the Title Page

Item (56), at the end of the FOREIGN PATENT DOCUMENTS section, insert
--CN    103364619 A    10/2013--

Signed and Sealed this
Twenty-seventh Day of June, 2017

Joseph Matal
*Performing the Functions and Duties of the*
*Under Secretary of Commerce for Intellectual Property and*
*Director of the United States Patent and Trademark Office*